(12) United States Patent
Niemann et al.

(10) Patent No.: US 8,434,359 B2
(45) Date of Patent: May 7, 2013

(54) SENSOR ARRANGEMENT FOR DETECTING AMBIENT CONDITIONS

(75) Inventors: Thomas Niemann, Delmenhorst (DE); Olaf Lüdtke, Vollersode (DE); Almut Schlarmann, Bremen (DE); Jürgen Palloks, Westerstede (DE); Antje Müller, Lilienthal (DE); Tim Petasch, Bremen (DE)

(73) Assignee: Hella KGaA Hueck & Co., Lippstadt (DE)

( * ) Notice: Subject to any disclaimer, the term of this patent is extended or adjusted under 35 U.S.C. 154(b) by 122 days.

(21) Appl. No.: 13/178,343

(22) Filed: Jul. 7, 2011

(65) Prior Publication Data

US 2012/0006110 A1      Jan. 12, 2012

(30) Foreign Application Priority Data

Jul. 8, 2010  (DE) .......................... 10 2010 026 562

(51) Int. Cl.
*G01W 1/14*    (2006.01)
*G01K 1/00*    (2006.01)

(52) U.S. Cl.
USPC ....................................... 73/170.17; 250/200

(58) Field of Classification Search .................. None
See application file for complete search history.

(56) References Cited

U.S. PATENT DOCUMENTS

| 3,533,702 A * | 10/1970 | Lang et al. ..................... 356/615 |
| 7,951,632 B1 * | 5/2011 | Quick et al. .................... 438/46 |
| 2011/0108860 A1 * | 5/2011 | Eissler et al. ................... 257/88 |
| 2011/0221372 A1 * | 9/2011 | Teder ............................. 318/446 |
| 2011/0315956 A1 * | 12/2011 | Tischler et al. ................. 257/13 |
| 2012/0007507 A1 * | 1/2012 | Niemann et al. ................ 315/82 |
| 2012/0217496 A1 * | 8/2012 | Tischler et al. ................. 257/43 |

FOREIGN PATENT DOCUMENTS

| DE | 195 26 249 A1 | 2/1996 |
| DE | 196 30 216 A1 | 1/1998 |
| DE | 100 05 127 A1 | 8/2001 |
| DE | 100 19 112 A1 | 8/2001 |
| DE | 10 2006 060 548 A1 | 6/2008 |

\* cited by examiner

*Primary Examiner* — Andre Allen
(74) *Attorney, Agent, or Firm* — Muncy, Geissler, Olds & Lowe, PLLC

(57) ABSTRACT

The invention relates to a sensor arrangement for detecting ambient conditions, in particular for a motor vehicle, with at least one carrier plate and optical elements arranged on this carrier plate, wherein several of the optical elements are arranged around a shared central region on the carrier plate, and at least two of the optical elements arranged around the central region exhibit primary action axes. These primary action axes are adjusted at a predetermined angle relative to the carrier plate, wherein the primary action axes are directed toward the shared central region. Additional sensors arranged on the carrier plate include a rain sensor, a solar sensor as well as various light sensors, which preferably are arranged on receiving surfaces of the carrier plate.

15 Claims, 3 Drawing Sheets

SENSOR ARRANGEMENT FOR DETECTING AMBIENT CONDITIONS

Figure 1:
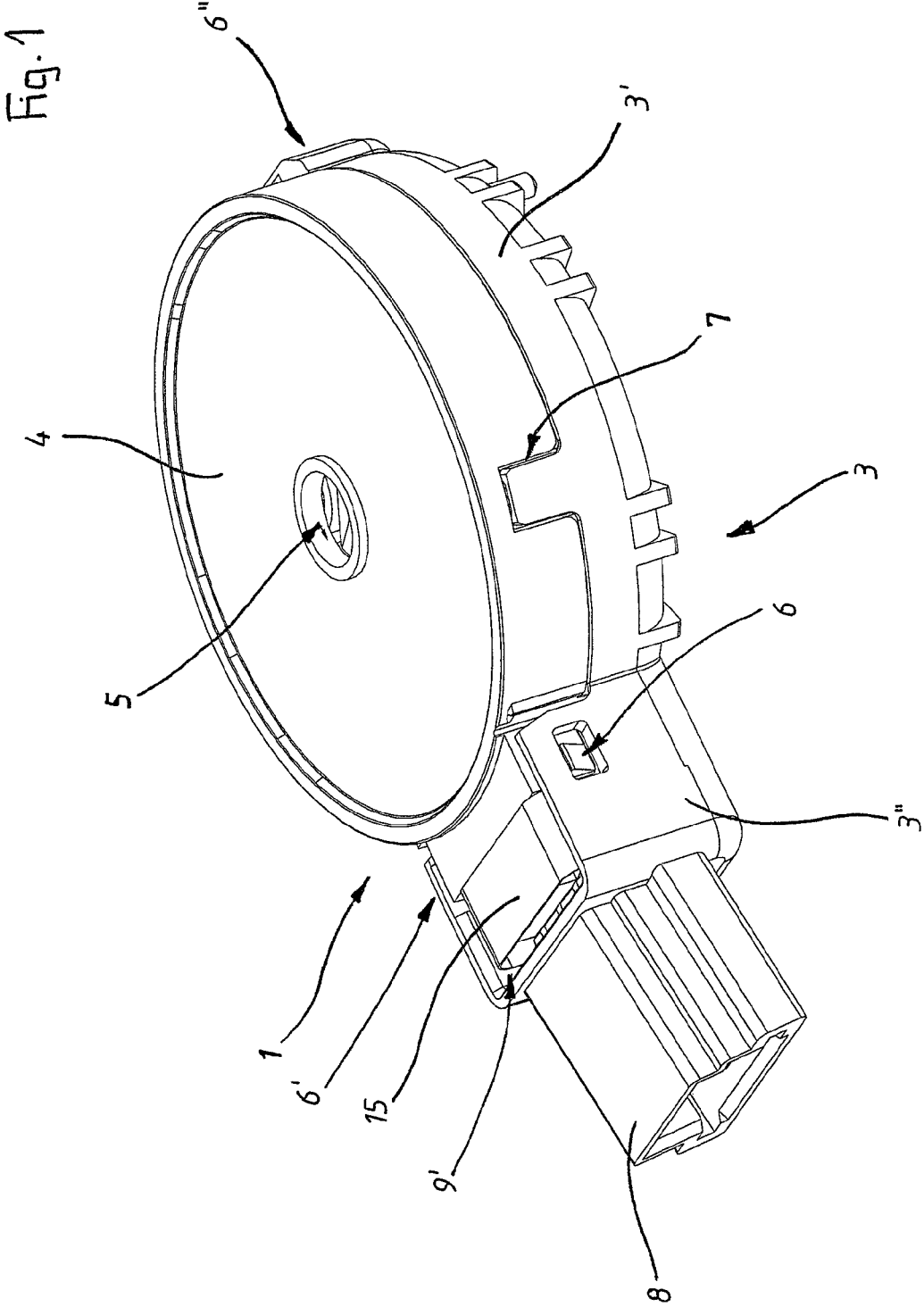

The invention relates to a sensor arrangement for detecting ambient conditions, in particular for a motor vehicle, with at least one carrier plate, in particular one printed circuit board, and optical elements arranged on this one carrier plate.

Optical elements for detecting ambient conditions arranged on a carrier plate are known from various applications. One example for an application of a sensor arrangement for a vehicle involves controlling the light of a vehicle as a function of the driving situation of the vehicle, as disclosed in DE 196 30 216 A1. Other sensor arrangements acquire data making it possible to air condition the passenger compartment of a vehicle, or detect precipitation, for example to automatically activate the windshield wipers of a vehicle. One disadvantage to current systems is that they are discretely configured, meaning that each function has allocated to it at least one sensor or sensor arrangement with one or more optical elements. However, a single sensor or single sensor arrangement is required for each function. The resultant costs are very high, especially during the installation of several sensors or sensor arrangements, since a plurality of diodes and optical systems must be integrated. In addition, each sensor or sensor arrangement requires space for accommodating the latter, wherein numerous individual sensors require a lot of space.

The object of the invention is to provide a sensor arrangement that combines several sensors with each other, enables a compact architecture of the sensor arrangement, and is especially cost effective to manufacture.

This object is achieved with a sensor arrangement having the features in claim 1. Advantageous further developments of the invention are described in the subclaims.

In a sensor arrangement for detecting ambient conditions, in particular for a motor vehicle, with at least one carrier plate, in particular one printed circuit board, and optical elements arranged on this carrier plate, wherein several of the optical elements are arranged around a shared central region on the carrier plate, and that at least two of the optical elements arranged around the central region exhibit primary action axes adjusted at a predetermined angle relative to the carrier plate, wherein the primary action axes are directed toward the shared central region, it is significant in terms of the invention that the optical elements with the primary action axes directed toward the central region are arranged on receiving surfaces of the carrier plate, wherein the receiving surfaces are adjusted at an angle to the carrier plate, and arranged perpendicular to the respective primary action axis of the optical element.

The shared carrier plate makes the optical elements especially easy to align relative to each other. Depending on the requirement profile and installed position, the primary action axes of the optical elements can be adjusted at different angles relative to each other. Hence, a predetermined installed position of the sensor arrangement makes it possible to set the detection ranges of the sensors. A complicated optical system is not needed.

Because the optical elements are arranged around a shared central region on the carrier plate, an especially compact outer shape of the sensor arrangement can be realized, since the individual optical elements can be assembled in an optimal manner. In particular, an especially compact shape is achieved with a circular arrangement of the optical elements. Individual optical elements can further be coupled with several functions, making the sensor arrangement inexpensive to manufacture.

As a result of the receiving surfaces are adjusted at an angle to the carrier plate, both the optical elements and the carrier plate are especially easy to fabricate. Depending on the alignment of the primary action axes of the sensors to be arranged on the carrier plate, the receiving surfaces of the carrier plate with the optical elements arranged around the shared central region can be adjusted to the respective angle relative to the carrier plate individually or as a group. To this end, corresponding surfaces are provided in the carrier plate during production, and folded over a predetermined edge, for example. As a result, the optical elements do not require any special custom-made devices with the shape precisely tailored to the respective application in question and an angled alignment relative to the receiving surface.

The optical elements to be arranged on the carrier plate are preferably sensors or light sources allocated to sensors, and designed as diodes. It is here provided that at least one optical element arranged on the carrier plate is a transmitting unit of a rain sensor, to which is allocated at least one optical element designed as a receiving unit. The transmitting unit is advantageously arranged centrally on the carrier plate between the optical elements situated around the shared central region, and the at least one optical element designed as a receiving unit exhibits a primary action axis adjusted relative to the carrier plate and directed toward the central region. The transmitting unit is a light source that emits infrared radiation. For example, the emitted infrared radiation is reflected from a disk or optical system of the sensor arrangement and onto one of the receiving units of the rain sensor, which detects the reflected radiation. If the disk or optical system is wetted with a liquid, in particular water, the angle of refraction changes, and the infrared radiation reflected back to the rain sensor deviates from a preset standard value.

Since a rain sensor with only one allocated receiving unit can only scan a very small surface, it is provided that the sensor arrangement has at least two, in particular at least four receiving units. These receiving units all preferably exhibit the same distance to the centrally arranged transmitting unit. This ensures that impinging rain can be detected with the highest certainty possible, since the rain sensor detects a larger surface and receiving unit tolerances are compensable among each other.

In another design of the rain sensor, it is provided that the receiving unit is arranged centrally on the carrier plate between the optical elements situated around the shared central region, and the at least one optical element designed as a transmitting unit exhibits a primary action axis adjusted relative to the carrier plate and directed toward the central region. According to the design with the transmitting unit arranged centrally on the carrier plate at least two receiving units, in particular at least four receiving units, are arranged around the central region.

In order to be able to determine the solar radiation, and in particular the distribution of the solar radiation on the object equipped with a sensor arrangement, it is provided that at least one of the optical elements having a primary action axis adjusted relative to the carrier plate and directed toward the central region is a solar sensor for detecting solar radiation. In particular, it is provided that the sensor arrangement encompasses at least two of the solar sensors, which are situated opposite to each other, thereby making it possible to calculate the angle of incidence of the sun's rays or position of the sun relative to the sensor arrangement. An enclosed space differs in terms of how cool or shaded it can be as a function of exposure to solar radiation, as reflected by the values determined by the solar sensor. If the sensor arrangement is in a greenhouse, the ventilation or shading could be tailored to the respective plants. An enclosed space can be provided with comprehensive air conditioning by linking the values detected by the solar sensors with additional data from other sensors in the sensor arrangement.

Another further development of the invention provides that at least one of the optical elements with a primary action axis adjusted relative to the carrier plate and directed toward the central region is an front end light sensor, and that the front end light sensor exhibits a detection range with a roughly horizontally aligned cone of coverage. This front end light sensor, which is designed as a switchable diode, and hence detects radiation in at least two different spectral ranges, can be used to detect brightness at a greater distance on the one hand, and a reflected light signal in the infrared spectral range on the other. In combination with an ambient light sensor, which is advantageously arranged on the carrier plate and exhibits a detection range with an upwardly directed coverage cone, various data can be detected about the brightness and changes therein. This is advantageous in particular for a vehicle, since data obtained with the two light sensors can be used to distinguish between tunnels and bridges, for example.

In order to be able to arrange additional sensors on the carrier plate, the latter advantageously extends into a connecting section as a one-piece. As a result, additional sensors can be optimally allocated on the carrier plate. The connecting section preferably exhibits at least one temperature sensor and at least one moisture sensor for detecting the air humidity. For example, a surface temperature sensor can be provided as the temperature sensor, along with another temperature sensor for detecting the air or room temperature of an enclosed space to which the sensor arrangement is allocated. Air can preferably stream through the respective sensors or connecting section of the carrier plate for measuring the air temperature, as well as for measuring the air humidity.

A sensor secured to a window for acquiring the surface temperature can be used to detect fogging on the window, for example, in particular in combination with the data from other sensors in the sensor arrangement. In addition, the acquired values about solar radiation, brightness, precipitation and temperature can be used to comprehensively air condition a closed space with the greatest possible accuracy and a high level of comfort.

The invention further relates to a motor vehicle that exhibits a sensor arrangement for detecting ambient conditions with at least one carrier plate, and optical elements arranged on this carrier plate, wherein the sensor arrangement exhibits a front end light sensor having a detection range with a coverage cone pointing in the traveling direction. The sensor arrangement is advantageously arranged on a windshield of the motor vehicle. This ensures that the sensors with optical elements can detect the ambient conditions without impediments. In addition, the room temperature and air humidity of the passenger compartment are optimally measured, since the windshield is best positioned to receive incident streaming air.

In order to optimally integrate the sensor arrangement arranged on the windshield into the design of the passenger compartment and vehicle, it is provided that the sensor arrangement is arranged in the base of the rear view mirror on the windshield of the motor vehicle.

Figure 2:
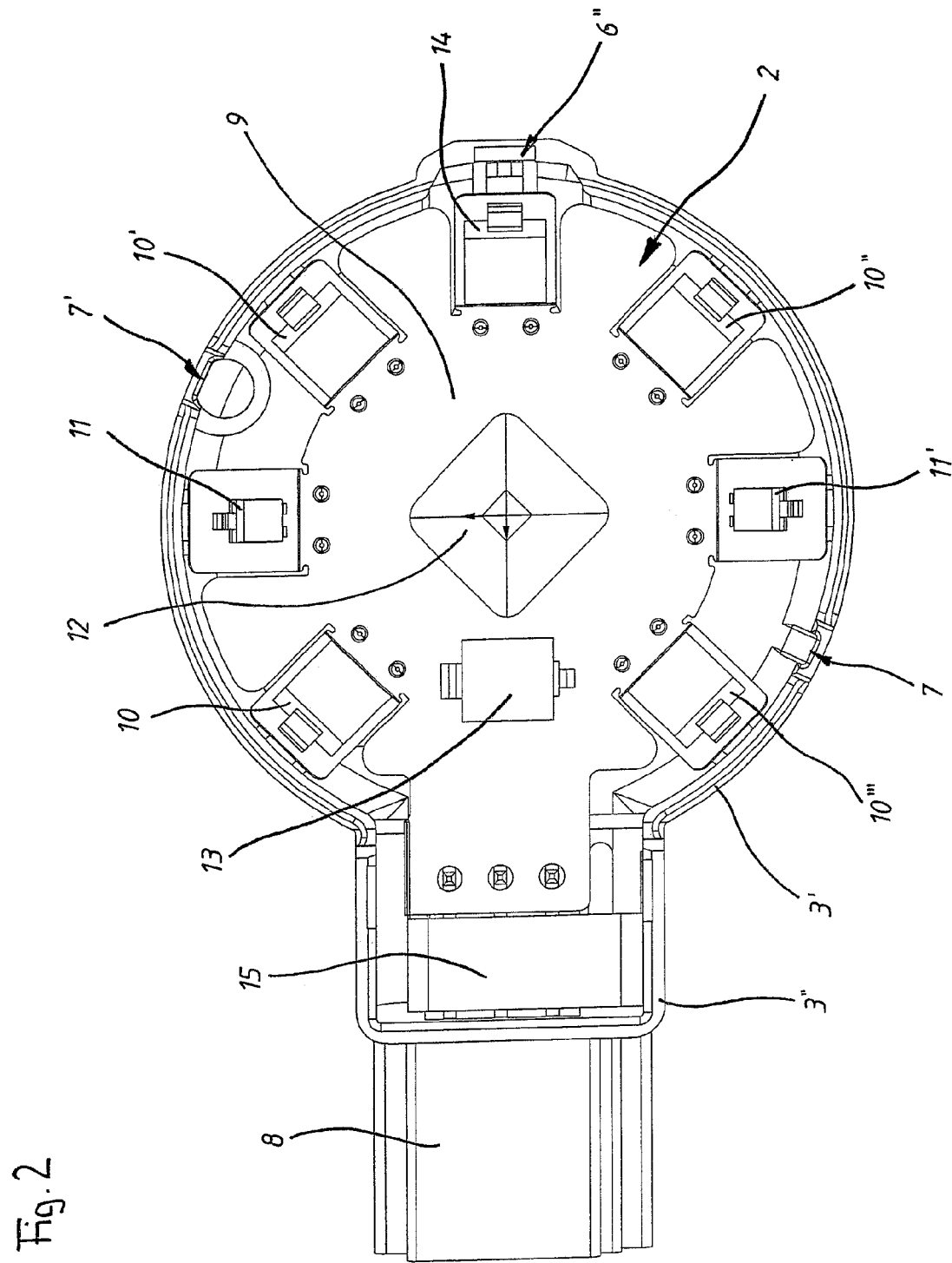

The invention will be further explained based on a preferred exemplary embodiment shown in the drawing. The figures specifically show:

FIG. 1: A perspective view of a sensor arrangement with enclosed housing;

FIG. 2: A top view of the sensor arrangement on FIG. 1 with opened housing, no cover, with exposed carrier plate; and FIG. 3: A perspective view of the carrier plate of the sensor arrangement on FIG. 1 and FIG. 2, with sensors arranged on the carrier plate.

A housing of a sensor arrangement 2 (FIG. 2) is marked 1. This housing 1 has a receiving section 3 and a cover 4, which are detachably joined together. The cover 4 is essentially circular, and the middle area of the formed circle exhibits an opening 5. The receiving section 3 exhibits a first circular receiving area 3' and a second oblong connecting area 3". Three snap-on connections 6, 6', 6" and two plug connectors 7, 7' are provided for joining the receiving section 3 and cover 4. The receiving section 3 exhibits three latching elements of the snap-on connections 6, 6', 6", of which two latching elements of the snap-on connections 6, 6' are arranged at the oblong connecting area 3" at the first end of the connecting area 3" abutting the receiving area 3', and a third latching element of the snap-on connection 6" is situated at the circular receiving area 3' on the side opposite the oblong connecting area 3". In addition, the receptacles for the two plug connections 7, 7' are arranged on the outer periphery of the circular receiving area 3'. Accordingly, the cover 4 exhibits detents and plug elements that correspond with the latching elements and receptacles.

The free second end of the oblong connecting area 3" of the receiving section 3 also exhibits a plug connector 8 for transmitting data and attaching the sensor arrangement 2.

Inside the housing 1, a carrier plate 9 is arranged on the receiving area 3' of the receiving section 3, extending with a connecting section 9' into the oblong connecting area 3" of the receiving section 3. The connecting section 9' projects out of the housing 1 with a partial area between the cover 4 and plug connector 8. In order to hold the carrier plate 9 in position on the receiving section 3, the receiving section 3 exhibits pins corresponding with recesses in the carrier plate 9.

Figure 3:
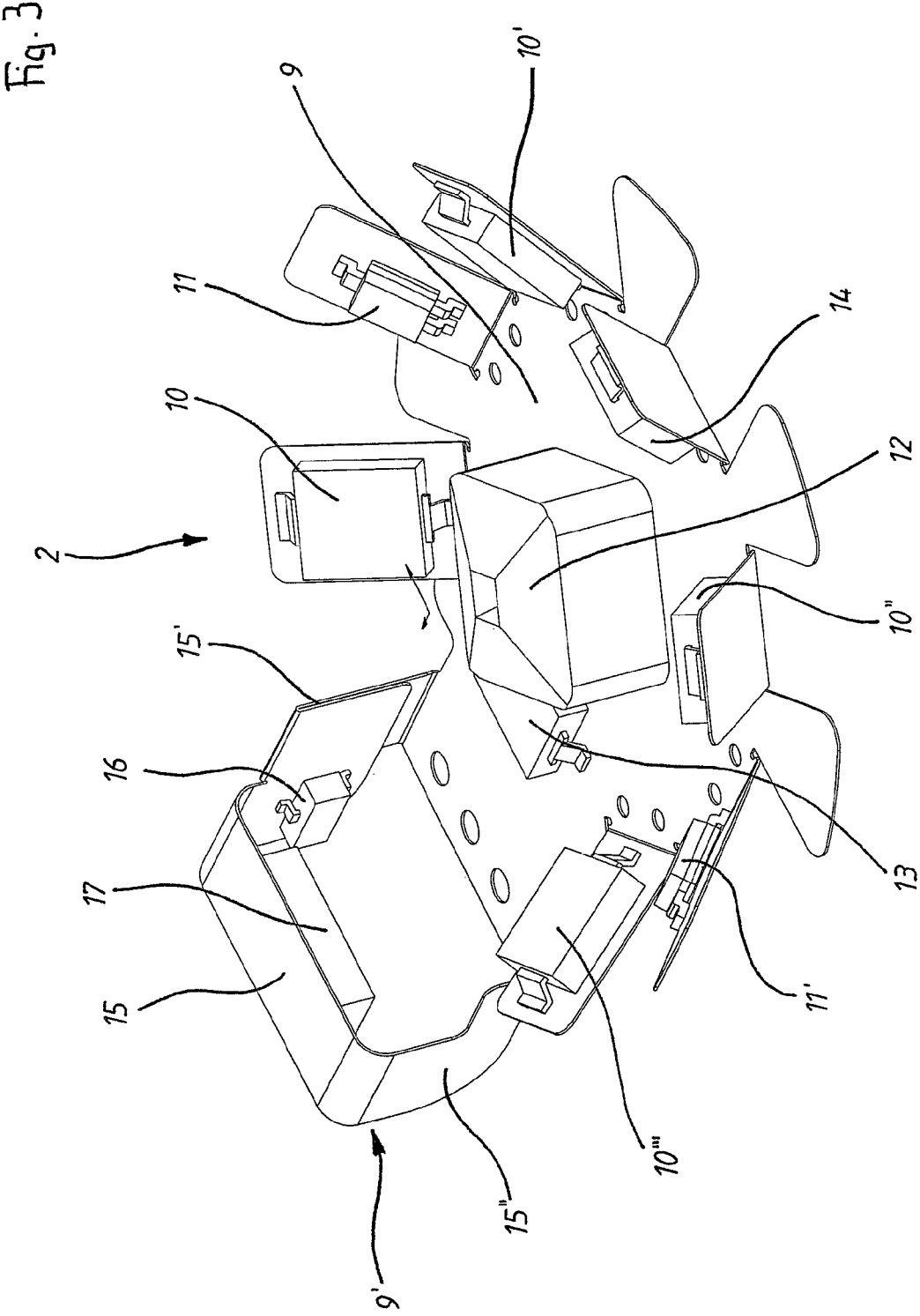

FIG. 2 and FIG. 3 show the architecture of the carrier plate 9 with the sensor arrangement 2. The carrier plate 9 is circular in design, and exhibits a diameter slightly smaller than the internal diameter of the circular receiving area 3' of the receiving section 3.

Around its central region the circular carrier plate 9 exhibits a total of seven surfaces adjusted at an angle relative to the carrier plate 9, which exhibit roughly the same distance from the central region. Optical elements are arranged on these surfaces.

Four of the seven optical elements on the adjusted surfaces of the carrier plate 9 are infrared radiation measuring receiving units 10, 10', 10", 10'" of a rain sensor, wherein the receiving units 10, 10', 10", 10'" are arranged around the central region of the carrier plate 9, in particular offset at an angle of 90° relative to each other. The central region of the carrier plate 9 exhibits a transmitting unit 12 of the rain sensor, to which the receiving units 10, 10', 10", 10'" are functionally allocated. The receiving units 10, 10', 10", 10'" measure the infrared radiation of the transmitting unit 12, for example reflected on a windowpane, which changes when water gets the windowpane wet. A respective solar sensor 11, 11' is arranged on the two remaining, oppositely adjusted surfaces of the carrier plate 9, and can be used to detect the direction of solar radiation.

Also situated on the carrier plate 9 between the transmitting unit 12 and the connecting area 3" of the receiving section 3 is an ambient light sensor 13, which detects the brightness in its detection range. A front end light sensor 14 is arranged on the adjusted surface, which lies with the transmitting unit 12 and ambient light sensor 13 on a straight line. This advance light sensor 14, which is designed as a switchable photodiode, and hence detects radiation in at least two different spectral ranges, can detect the brightness in a predetermined distance to the sensor arrangement 2 on the one hand, and a reflecting light signal on the other. The opening angle for the coverage cone of the sensors is prescribed in particular by the dimensions of the opening 5 in the cover 4 and the position or arrangement of the respective light sensor 13, 14 relative to the opening 5.

The connecting section 9' is repeatedly angled by a respective 90° and projects through an opening with a contact surface 15 between the cover 4 and plug connector 8, which forms the partial region of the carrier plate 9 visible on FIG. 1. Two surfaces 15', 15" of the connecting section 9' perpendicular to the contact surface 15 and carrier plate 9 abut the contact surface 15, of which the surface 15' joins the contact surface 15 with the carrier plate 9. The configuration of the connecting section 9' may be gleaned in particular from FIG. 3, wherein the two surfaces 15', 15" are arranged parallel to the inner wall of the oblong connecting area 3" of the receiving section 3.

Situated on the insides of the surfaces of the connecting section 9' are a temperature sensor 16 for detecting the room and air temperature, and a combined humidity and temperature sensor 17 for acquiring a surface temperature as well as the room or air humidity. The combined temperature and humidity sensor 17 is here arranged on the contact surface 15 protruding out of the housing 1, while the temperature sensor 16 for acquiring the room or air temperature is arranged on the surface 15' of the connecting section 9' situated perpendicular to the carrier plate 9.

This embodiment of the sensor arrangement 2 is situated on the inside of the windshield of a vehicle, wherein the side with the cover 4 faces the windshield of the vehicle, and the oblong connecting area 3" of the receiving section 3 is directed in the traveling direction. Hence, the detection range of the front end light sensor 14 exhibits an acquisition cone directed essentially in the traveling direction of the vehicle, while the ambient light sensor 13 exhibits a detection range with an essentially upwardly directed coverage cone. The data detected by means of the ambient light sensor 13 and front end light sensor 14 can be used to adjust the headlight controller to the respective driving situation of the vehicle. Fog, snow or other ambient conditions that influence visibility can also be detected.

The invention claimed is:

1. A sensor arrangement for detecting ambient conditions, in particular for a motor vehicle, with at least one carrier plate, in particular one printed circuit board, and optical elements arranged on this carrier plate, wherein several of the optical elements are arranged around a shared central region on the carrier plate, and at least two of the optical elements arranged around the central region exhibit primary action axes adjusted at a predetermined angle relative to the carrier plate, wherein the primary action axes are directed toward the shared central region,
wherein
the optical elements with primary action axes directed toward the central region are arranged on receiving surfaces of the carrier plate, wherein the receiving surfaces are adjusted at an angle relative to the carrier plate, and arranged perpendicular to the respective primary action axis of the optical element.

2. The sensor arrangement according to claim 1, wherein at least one optical element arranged on the carrier plate is a transmitting unit of a rain sensor, which has allocated to it at least one optical element designed as a receiving unit.

3. The sensor arrangement according to claim 2, wherein the transmitting unit is arranged centrally on the carrier plate between the optical elements situated around the shared central region, and that the at least one optical element designed as a receiving unit exhibits a primary action axis adjusted relative to the carrier plate and directed toward the central region.

4. The sensor arrangement according to claim 2, wherein the rain sensor exhibits four receiving units and one transmitting unit.

5. The sensor arrangement according to claim 3, wherein the rain sensor exhibits four receiving units and one transmitting unit.

6. The sensor arrangement according to claim 2, wherein the receiving unit is arranged centrally on the carrier plate between the optical elements situated around the shared central region, and that the at least one optical element designed as a transmitting unit exhibits a primary action axis adjusted relative to the carrier plate and directed toward the central region.

7. The sensor arrangement according to claim 2, wherein the rain sensor exhibits four transmitting units and one receiving unit.

8. The sensor arrangement according to claim 5, wherein the receiving unit is arranged centrally on the carrier plate between the optical elements situated around the shared central region, and that the at least one optical element designed as a transmitting unit exhibits a primary action axis adjusted relative to the carrier plate and directed toward the central region.

9. The sensor arrangement according to claim 1, wherein at least one of the optical elements having a primary action axis adjusted relative to the carrier plate and directed toward the central region is a solar sensor for detecting solar radiation.

10. The sensor arrangement according to claim 1, wherein at least one of the optical elements with a primary action axis adjusted relative to the carrier plate and directed toward the central region is a front end light sensor, and that the front end light sensor exhibits a detection range with a roughly horizontally aligned cone of coverage.

11. The sensor arrangement according to claim 1, wherein at least one optical element on the carrier plate is an ambient light sensor, and that the ambient light sensor exhibits a detection range with an upwardly directed coverage cone.

12. The sensor arrangement according to claim 1, wherein the carrier plate extends into a connecting section as a one-piece.

13. The sensor arrangement according to claim 12, wherein the connecting section exhibits at least one temperature sensor and at least one humidity sensor for detecting the air humidity.

14. A motor vehicle,
wherein
it exhibits a sensor arrangement according to claim 1, and that the sensor arrangement exhibits an front end light sensor with a coverage cone pointing in the traveling direction.

15. The motor vehicle according to claim 14, wherein the sensor arrangement is allocated to the windshield of the motor vehicle.

* * * * *